INVENTOR.
MICHAEL SVEDA
BY
ATTORNEY

FIG. 11

INVENTOR.
MICHAEL SVEDA

United States Patent Office 3,449,841
Patented June 17, 1969

3,449,841
PROCESS AND APPARATUS FOR GRAPHICAL REPRESENTATION OF INTELLECTUAL PROFILES AND COMBINATIONS OF MENTAL CHARACTERISTICS AND DISCIPLINES IN SCIENCE, EDUCATION AND BUSINESS FIELDS
Michael Sveda, Zaccheus Mead Lane,
Greenwich, Conn. 06830
Continuation-in-part of application Ser. No. 540,938, Apr. 7, 1966. This application Dec. 22, 1967, Ser. No. 701,512
Int. Cl. G09b *19/00*
U.S. Cl. 35—22        10 Claims

ABSTRACT OF THE DISCLOSURE

Two general types of process and apparatus are described. The first involves the positioning or actual movement of profiles which are thin, vertical members and which may be fitted into and moved in grooves on boards. The profiles, which can either be cut out in the case of opaque material or transparent material or drawn on larger sheets of transparent materials in ink, tapes, etc., represent various mental characteristics, such as knowledge in a given field, achievement, personality traits, and the like. The profiles can be moved during the expository process, or different positions can be shown sequentially, as by slides, motion picture film, and the like.

CROSS-REFERENCES TO RELATED APPLICATIONS

This application is a continuation-in-part of my copending application Ser. No. 540,938, filed Apr. 7, 1966, and now abandoned.

BACKGROUND OF THE INVENTION

Explanations, education, and expositions of a number of problems have required conveying relationships of characteristics, intellectual requirements or experience and the like, which is difficult to effect by oral exposition or teaching, especially where it may be necessary to teach various interrelations to persons who may not be intimately conversant with certain of the fields involved. An example may involve managers or executives who are not conversant with the details of many scientific disciplines which are needed in evaluating the solutions to particular problems.

One illustration involves the problem of matching requirements for a particular job with the intellectual or other mental characteristics of individuals have been approached in the past in a rather empirical manner with empirical judgments. The problem is very difficult to state in words, and even more difficult when it is necessary to explain and clarify the problem for those whose intellectual experience may not be particularly suited. For example, if business or management consultants have to analyze or make recommendations to business management, educational institutions, government agencies, etc., it is essential that they make their points clear to the manager or administer whose profession is not that of making precise intellectual analyses of knowledge, experience, and other mental characteristics of individuals or a number of individuals to make up a team.

The business executive often has difficulty in understanding or visualizing explanations because, as with a great many communications problems, human beings are taught much more through the eye than through the ear.

In teaching and some other analogous procedures a problem is raised due to the fact that often it is necessary to relate on an elementary or more advanced level unitary characteristics, such as scientific concepts, to various disciplines or fields. For example, a single concept, such as heat, may have very different connotations in a number of disciplines, which is difficult to teach, especially on elementary levels.

Graphical representations have commonly been used, such as graphs and the like and even three-dimensional scenes in which static figures or other representations have been mounted in grooves in a board. The graphs or the pictorial representation if they are not used in different positions or moved can fail to convey information which involves changing of characteristics with time, interaction of a number of elements, characteristics or people in a problem, and the like.

SUMMARY OF THE INVENTION

The present invention involves two general types of expository process using graphical representations which can be moved or their position altered to represent interactions of various characteristics for the solution of problems by means of movable graphical representations. These representations are tangible whether of physically movable elements or successive photographic representations of different positions, and so, as is the case with a great many processes, it involves the manipulation and use of elements which have real or tangible form. However, as is the case with many processes requiring tangible elements, the process can be carried out with a number of simple mechanical setups. Some of these arrangements are also novel in the form of their construction, and so the present invention may be considered to have both a broad process aspect and also a more narrow apparatus aspect.

There are two general types of the present invention, one of which requires thin vertical profiles, either cut out in the case of materials which may be either opaque or transparent, or drawn onto transparent materials. The other form is a horizontal element, such as a plate-like or dish-like, element with movable labels attachable around the periphery thereof.

The profiles each represent a two-dimensional graphical representation and they can be in different successive positions or physically moved, for example by sliding thin profiles in suitable grooves on a substrate. In general a profile will represent different degrees of different characteristics. For example, a profile may represent the knowledge, potential or actual, or experience or achievement of a person in several fields of knowledge or disciplines. A profile may also represent the requirements for a problem, a team, a project, or the like, against which various other profiles can be matched, and these other profiles can be moved or shown in different positions and may represent, for example, the matching of a problem with a number of individuals of different experience or knowledge.

In many cases profiles may be moved in parallel planes, for example along parallel grooves of a suitable substrate. Particularly with transparent profiles, a number can be moved into various positions to illustrate an exposition of requirements and can also show growth, the increased educational effect of working together of persons specially versed in different scientific disciplines, and the like. The movement of the profiles may be in various directions which are not parallel which produce a three-dimensional representation.

The expository or teaching process may involve actual physical movement of profile elements, and this is the best and most dramatic where audiences are sufficiently small so that all can see what is happening. It is also possible to utilize the processes of the present invention to represent different positions separated in time or otherwise which can then be photographed onto slides or other media which can be projected onto screens permitting the use of the graphical representations in explanations or teaching to much larger audiences. It is also possible to photograph successive positions on motion picture film and so to show an actual movement even on a screen, although usually the increased cost is not warranted and often positioning where one position can be held for as long as it is necessary with a particular audience presents distinct advantages. Because the effect of movements of different profiles with respect to each other can be considered at the limit an infinite number of different displaced positions, there will be used in the further description of the present invention the general term "positional representation," which is intended to cover both discrete representations of slides or actual continuous movement of profiles where the nature of the exposition or teaching and the audience make this possible or preferable. The fact that different positions of stationary profiles can show the effect which can be produced by actual movement is illustrated, for example, in FIGURES 6 and 7 of the drawings, which will be described below, where different positions convey the same information as actual movement.

The second general type of the invention involves the relation of various elements to a unifying thought or thread. For example, discs of plastics or other material, dished if necessary for greater stiffness, with removable tabs, such as labels with a grasping jaw, can be used with the labels fastened around the periphery of the discs. It should be noted that the label may be attached or removed and another substituted, and so the effect of changing representation with time or progress of a project or exposition can be represented.

In general, the disc will represent a unifying concept to which a number of distinct elements, such as persons, knowlege, facts and the like, may be attached. This modification may be used with cheap paper plates on which a common characteristic can be written or labeled onto the plate, which is expendable; and labels or tapes may range all the way from labels on ordinary clothespins to labels provided with a suitable jaw. Labels or tabls can, of course, also be attached to the periphery of profiles which have been cut out, which is sometimes desirable for purposes of emphasis or applying further information to portions of a profile. From an apparatus standpoint, the more sophisticated construction of labels with a spring jaw which can either be slipped over the edge of another thin element, such as a profile, or can provide sufficient springiness to hold a profile or a label in a groove in a substrate presents some advantages in versatility of use.

As the exposition of various facets of the present invention is more clear and more striking when graphical representation in different positions is used, that is to say, the principles of the process of the present invention are employed, various fields of the invention will be described in conjunction with a more specific description following the drawings.

DESCRIPTION OF THE PREFERRED EMBODIMENTS

Figure 1:
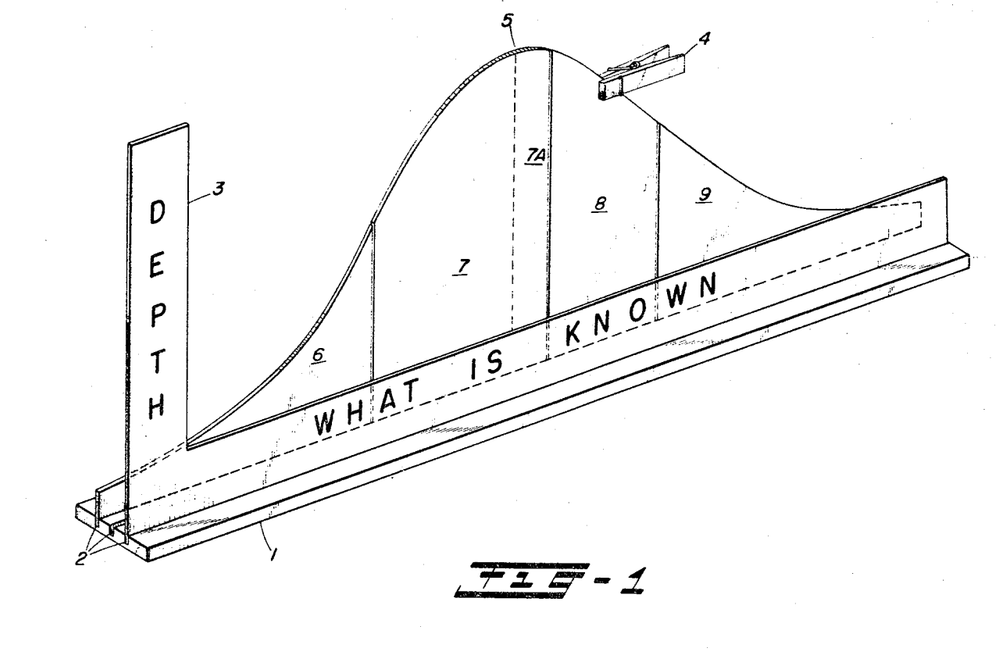
FIG. 1 is an isometric view of a grooved board for uniplanar profiles.

FIG. 1 shows a board, which may be of wood, plastic, hardboard, or any other suitable material, including metals, the board being shown at 1. It is provided with three grooves 2 in each of which a cutout profile can be placed and moved. A simple scale of ordinate and abscissa 3 is shown in one of the grooves. As a typical example for analysis of an individual's knowledge or required profile of knowledge for a job, the scale may represent along its abscissa what is known, that is to say the different fields of knowledge or disciplines in which the man or a series of men have knowledge or expertise. The ordinate shows depth of knowledge at a particular point in particular fields or disciplines. The scale 3 may be marked off with indicia, such as division marks, labels and the like, but is shown plain in order to eliminate confusion of the drawing. Fields of knowledge can be represented along the board by suitable tabs as shown for sake of illustration by a clothespin 4 which may bear on its flat upper surface the name of a particular field of knowledge or a particular discipline.

A cutout 5 representing the intellectual profile of a particular man or the profile required for a job dealing with a particular instance in biochemistry is shown divided into four fields 6, 7, 8 and 9. Let us assume that the four fields are physics, chemistry, biology and statistics respectively. The different fields may be colored different colors and/or may have the abbreviation of the particular field of knowledge or intellectual discipline.

FIG. 1 represents the problem of illustrating a profile of a bio-chemist, the extent and depth of whose knowledge in the field of chemistry, 7, is the greatest portion of his intellectual equipment. We can sub-divide field 7 further as shown by the dotted line into an area 7a which may be a particular kind of chemistry, in this case organic chemistry related to life processes. It will be obvious that the particular man has his greatest depth of knowledge in this kind of organic chemistry and also his broadest acquaintance in the general field of chemistry. Of course, in the illustration given, the clothespin 4 would bear the label CHEM to indicate the particular field in question if the cutout profile itself was not so labelled. In this particular case field 8 is biology, field 9 physics, because our bio-chemist may be particularly concerned with the electrical phenomena of physiology and related biochemistry, and field 6 may be statistical mathematics if our hypothetical bio-chemist has had extensive knowledge in evaluating bio-chemical phenomena in terms of statistics. It is immediately apparent from the profile that the man in question has his greatest depth of knowledge in a particular field of organic chemistry and in some portions of biology, with much less depth of knowledge in physics and still less in statistical mathematics.

FIG. 1 represents a comparatively simple and idealized illustration. It will be noted that the curve is symmetrical and of course, as with all curves in this portion of the invention, the area of the curve represents the man's total overall intellectual capacity or potential.

FIG. 1 illustrates the profile of a so-called hybrid scientist, that is, a man who has extensive knowledge in several fields or disciplines, in this case chemistry and biology. It is more common to encounter scientists who are more or less specialized in a single discipline. The profiles of the scientific knowledge of these men are much narrower but also higher, which represents deeper knowledge in a narrower field. This type of profile will be illustrated below in connection with FIG. 2.

It has been stated that FIG. 1 may be the profile of a particular man or the profile of a job requirement. Of course the same considerations apply, but in the case of the job requirement the likelihood of a relatively smooth and idealized curve is greater than in the case of a particular human being.

Figure 2:
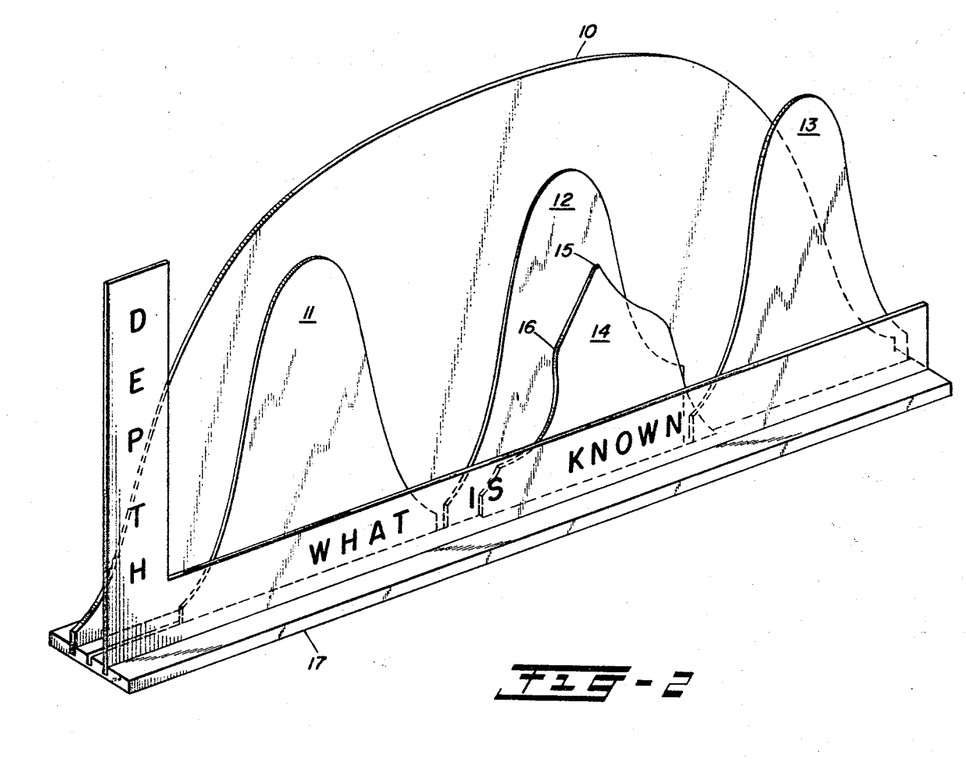
FIG. 2 is a similar illustration for the combination of a number of profiles.

FIG. 2 represents an elaboration of the type of representation shown in FIG. 1 to solve a somewhat different problem. Here the requirements are illustrated as a wide field of knowledge with good depth through a large portion of it. This might be thought of as similar to the situation in past centuries by so-called universal geniuses, such as Leonardo da Vinci. In the present day such a profile can almost never be approximated with a single man. However, some approximation can often be made with a team of carefully selected members, and this is what FIG. 2 illustrates. The requirements for a desirable composite profile will be described in conjunction with the problem of picking a team for building a hydroelectric plant in an undeveloped country of not too settled government. Four principal requirements are illustrated as a civil engineer, represented by the cutout 11, an electrical engineer with specialized knowledge in power generation and distribution, represented by cutout 12. Another important member of the team is a man who must have experience and tact in dealing with people who have very different backgrounds and a great deal of local pride. Such a man is illustrated by cutout 13. Finally, let us assume that the country is bi-lingual, speaking both French and a native dialect. This requires someone with interpretive knowledge. It is obvious that the man does not need as great depth of knowledge in languages as is required by the engineers and the general negotiator. This is represented by the cutout 14 with a peak 15 corresponding to knowledge of French and the fairly good, although not quite so great a depth of knowledge of the native language at the point 16.

It will be seen that the team makes a fair approximation of the job requirements, although, particularly in the case of the men represented by cutouts 13 and 14 not quite so high a depth of knowledge. Only four men are illustrated because they represent the ones that have to work most closely together. Other men on the team, such as cost accountants and the like, while they would be needed, do not interrelate to the same extent with the ones illustrated and are therefore not shown.

It would have been very difficult to evaluate the key personnel purely by verbal means. The graphic plot of FIG. 2, however, immediately makes the matter clear and can be used to illustrate and to explain to people who have authority and duty to make the necessary decisions but do not have specialized scientific skill. For example, in the case just mentioned, FIG. 2 could be used for showing a solution to the problem to a member of the State Department or a Congressional committee, neither of whom would have the specialized scientific knowledge. By the same token, the representation would be helpful to management of the prime contractor who receives the contract to build the plant.

In many cases the illustration of FIG. 2 would be photographed or otherwise stored because the building of the plant is something that takes several years. FIG. 2 represents, therefore, the initial team chosen.

From time to time it may be desirable to evaluate how the team is progressing in terms of its individual members, and this can easily be done with further representations arranged in a manner similar to that of FIG. 2. The cutout 10 of course remains. However, the profiles of the particular men are not necessarily static. Presumably, if the team is functioning well they will learn a good deal as the job progresses, both from the experience on the job and from working and consulting with each other. In such a case the engineers would not gain so greatly in the depth of their specialty but would learn something of the adjacent disciplines. In other words, their curves would widen out somewhat and this would help to fill up cutout 10. In other words, if the team is functioning very effectively they will be a closer approximation to the original requirements than at the beginning. The negotiator, profile 13, will probably learn more than will the engineers, and therefore his profile will probably be considerably higher at the end of a year if he is working effectively. Also, there will be lateral growth because, of course, the negotiator will learn some of the problems of the two engineers. The linguist will have his curve rise and be flattened out, because he may, after, a year, be almost as proficient in the native dialect as he was in French.

What has just been stated represents growth in efficiency of a team, but success is not always something that can be guaranteed, and it is possible that one or more of the men may be less efficient at the end of the year. In the case of the engineers this would be most likely to occur from nostalgia or lonesomeness for wife and family, and if they appear to be less effective at a later time, the representation may point to a simple solution. The engineer's own technical competence may also be affected, though perhaps less drastically, by the fact that he has not had opportunity to talk to other engineers in his special field.

The negotiator might show a distressing lowering of the height of his profile, and this would point up the need for investigating the reasons. It might be an unfortunate conflict with somebody in authority in the country. Again, the solution becomes obvious after the illustration is studied. Also, the choice of the replacement can be helped by the same illustration. The above extremely sketchy description is an illustration of the change and continuing value of the present invention to represent situations differing in time. In order to simplify the representation of FIG. 2, the linguist has been treated as a separate person. Of course, his knowledge may be part of that of one of the other men, for example the negotiator.

In such a case the negotiator's profile would have an extensive side wing in the linguistic field.

Figure 3:
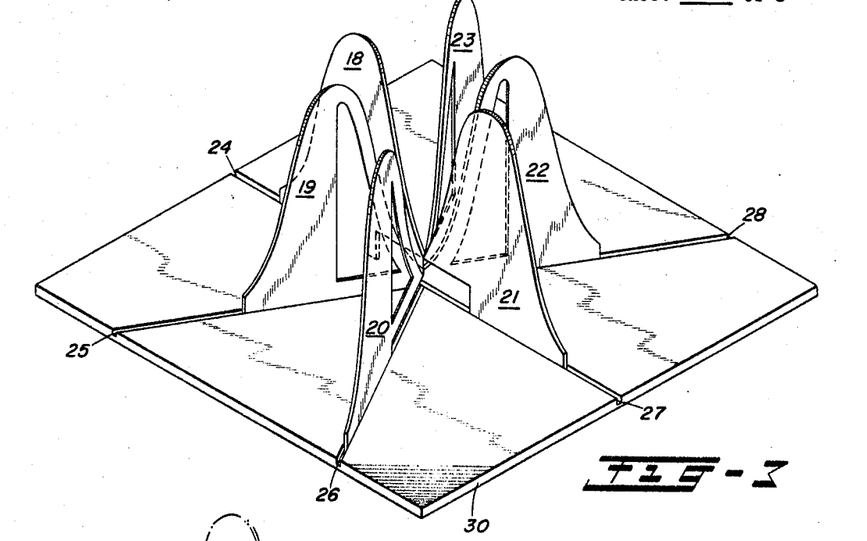
FIG. 3 is an isometric view of a board with radial grooves.
Figure 4:
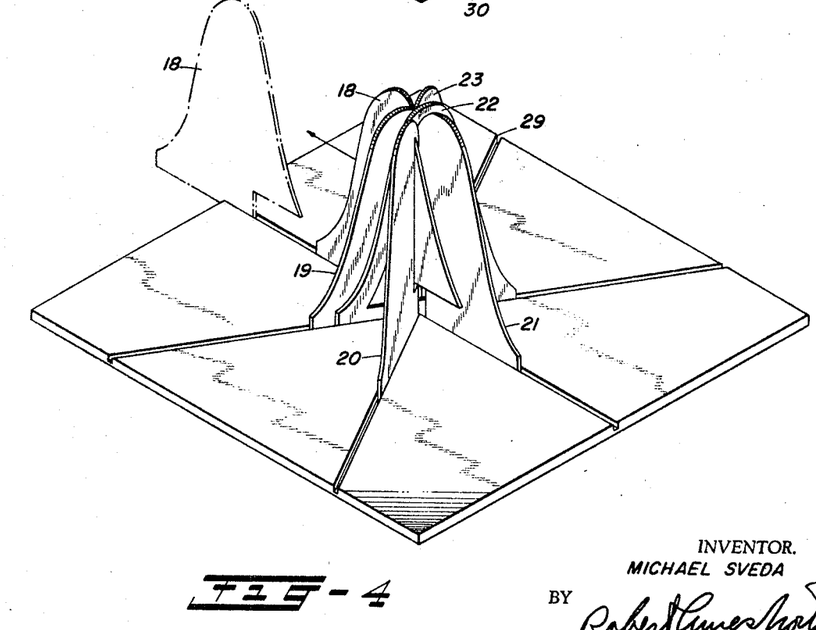
FIG. 4 is a similar isometric view of a board with radial grooves with profiles which can slide past each other to produce a three-dimensional solid effect.

FIGS. 3 and 4 represent more complex situations requiring a number of men of different skills in different disciplines, including a clearer representation of some factors discussed in the description of FIG. 2. FIG. 3 shows the situation at the start. Board 30 is provided with radial grooves 24, 25, 26, 27, 28 and 29, the last showing only in FIG. 4, as in FIG. 3 it is obscured by the cutout of a particular man represented by 23. Let us assume that 19 represents a chemist, 20 a physicist, 21 a chemical engineer, 22 an analyst, 23 a pharmacologist, and 18 a specialist required only occasionally, such as a clinician.

The problem is to develop a better pharmaceutical in which it is expected that at various stages extensive infrared and nuclear resonance tests will be required for determination of structure.

FIG. 3 represents individual knowledge of the six men at the start of the investigation. Ideally, of course, the team should be represented by a cylinder in the center of the board with a fairly uniformly high level. In FIG. 3 a lot of this is empty space. In FIG. 4, however, which shows the members of the team after they have worked together, this space has been very extensively filled in and it shows that a much higher level of accomplishment is obtained with these particular people working together. Also shown in dashed lines is the fact that the clinician will normally retire from work with the team to make tests by himself or in his own laboratory and then return. This is shown in dashed lines in FIG. 4. At the start the clinician is probably not needed at all, and his cutout can therefore be shown as removed from the board or as in its position in FIG. 3. As the research proceeds, the clinician brings back more and more knowledge to the team, which can be shown by cutouts of different shape which embody his experience on this particular problem, and the whole problem can be followed and, if necessary, changes made when the team working on the problem shows that one or more are either not needed or are not ideal.

FIG. 4 represents the situation when the various men are discussing the problem together after having worked on it for some time as a team. Of course, in many if not most cases, the different men will be retiring to their own laboratories for more or less lengthy periods of time. In other words, they will behave somewhat as is shown for the clinician in dashed lines, though in some cases not to so extreme an extent. The fact that the pieces representing the different men are readily movable to bring out the important factors just discussed also makes this form of invention useful for presentation to large audiences, such as stockholders' meetings, lectures in specialized refresher courses for business managers and the like. When the illustration is for a large audience which requires larger cutouts, means for mechanically moving them are often desirable.

FIGS. 3 and 4 are a representation which has an additional very valuable factor, namely that it brings home to the individual scientists very forcefully the necessity of close intercommunication, because without this one or more of them looks as in FIG. 3 and his contribution is to a considerable extent wasted or decreased because it has not been used by his brother scientists. In the aspect just described, the present invention might be said to serve not only as a graphical representation of a problem and the people well equipped to solve it but also for illustrative purposes to bring home to different members of the team various things which they might not otherwise have realized. In general the present invention permits a graphical representation, if necessary in three dimensions, which may serve the purpose of illustration, communication to management or to others who are not intimately connected with a particular scientific or business problem, and also to teach certain important precepts. Actually, of course, the results are really different forms of communication, because basically this is an important and perhaps the most important factor in teaching as well as persuading people or illustrating points.

FIGS. 3 and 4 illustrate the combination of specialized knowledge and the cross fertilization between the men who are working together. The same type of representation is important where the men coming together are more generalists rather than specialists, that is to say managers, administrators, and the like. The present invention can show clearly the advantages of their getting together in periodic meetings, and of course, just as in the case of some of the scientists, they then go back to their own departments, bringing with them the greater breadth of information on a general problem which has been obtained by the meeting of the diverse minds directed toward the solution of a particular problem. When the manager or administrator returns to his own department, not only has his own knowledge been broadened but he is in a position to pass this information on to those who are working in his department.

FIGS. 1 to 4 have been described in connection with the illustrations showing scientific, engineering, and other professional personnel. The scientific disciplines are often easier to illustrate, and in some cases the disciplines are more clearly separated. Exactly the same considerations, however, can be used in determining requirements for a managerial or administrative job. In general these jobs require a broad knowledge with less specialization. In fact, we may consider that the cutout 10 in FIG. 2 has the general shape which is more nearly that of a manager or administrator, although of course with a much higher depth of knowledge, which is made possible by a team. In the case of a manager or administrator, while the cutout may have a similar profile shape, it will normally be much lower. Although the height of the curve may not be as great, the distribution of the fields of knowledge required are, if anything, more vital because a manager or administrator may be administering very different things in one company than in another. To put this another way, in the case of a manager's profile, the abscissa may be more important than the quantitative height of a particular ordinate.

The modifications of the invention shown in FIGURES 1 to 4 illustrate the preferred way of handling cutout profiles, namely by grooves of width such that a single profile or two can be accommodated. For example, in the case of FIG. 2 it would have been possible to have both profiles 10 and the others in the same groove, sliding past each other. It is also possible to have cutouts which are mounted on small magnets, using a magnetized board, preferably one with certain definite magnetic tracks corresponding to the grooves. Other methods of supporting a profile cutout may also be used, and broadly the present invention is not concerned with the particular way in which the profiles are movably mounted. In a more specific aspect, of course, the preferred grooves are included.

In FIG. 1 the movable label has been described as a clothespin with suitable information on its flat surface. This is a simple form but quite different in its mechanical design from the profile cutouts themselves. Labels can, of course, be in the form of cutouts moving in a groove in front of the other cutouts, and if they are low enough they may be opaque. It is also posssible to use labelling cutouts which are of transparent plastic. In fact, it is an added advantage of the present invention that the materials used may be chosen for best results, and any of the cutouts may be transparent where this is desirable.

In FIGS. 3 and 4 radial paths permit illustration of the combination of a larger number of characteristics, men and the like. It is not necessary in all cases that there be a single board with radial grooves. Two grooved boards, such as those illustrated in FIGS. 1 and 2, may be fastened together in the form of a cross, which permits illustrating two profiles, for example at right angles to each other. This is particularly useful where it is desired to represent mental equipment of a single man. Along one axis of the cross his scientific knowledge may be set forth, for example as in FIG. 1. In the other direction a different type of profile, for example the man's skill in managing or administering a problem. These characteristics are usually quite different from the scientific disciplines of his technical knowledge and include such characteristics, innate or acquired, which deal with his relations with other people, for example, tact, appearance, judgment, persuasiveness, forcefulness and the like. Obviously, these characteristics can be shown in boards with radial grooves as described in FIGS. 3 and 4, but the above description is merely as illustration that where the problem of representation is somewhat simpler it can be handled by multiple boards of the type of FIGS. 1 and 2.

Figure 5:
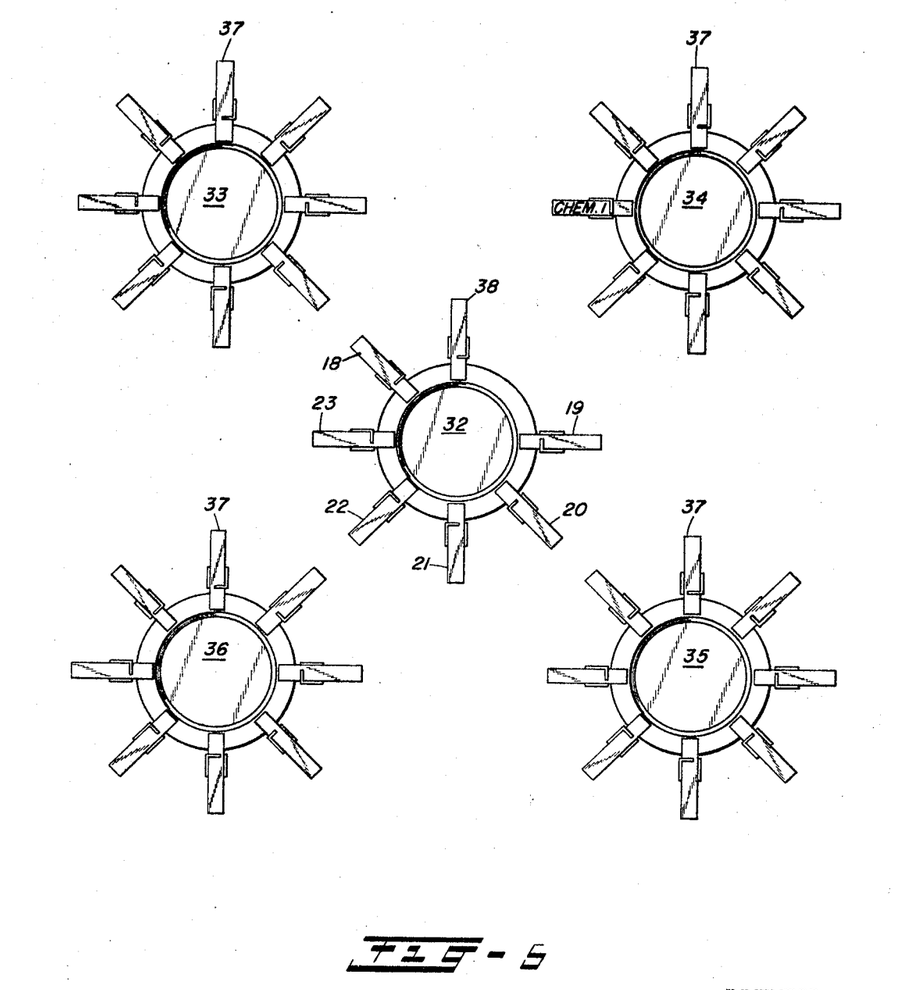
FIG. 5 is a plan view of a series of discs or plates with removable tabs.

FIGS. 3 and 4 illustrate a type of graphical representation in which, among other things, a number of scientific disciplines or scientists or business experts are brought together to relate to a particular center problem. The representation is three-dimensional. However, for many purposes the third dimension is not needed. Thus, for example, it may be sufficient to determine what disciplines are needed without going into the quantitative mounts of the various ones. For example, for many purposes it is sufficient to know that one needs a market analyst, a chemist, a cost accountant and a production engineer, without specifying the exact depth of knowledge that each of these different people have in particular parts of their disciplines. This permits simpler apparatus setup and for certain purposes of illustration, communication or teaching, or at certain stages of developing the solution to the problem is quite adequate. Such a modification is shown in FIG. 5. It may be considered as a two-dimensional representation and will be described in conjunction with an extremely cheap and available type of material, namely paper plates and ordinary wooden spring clothespins. Of course the invention is not limited thereto and any structure can be employed which is preferably capable of being turned and to which tabs or other labelling surfaces may be attached.

In FIG. 5 there is a central paper plate 32, which may be used alone or associated with other paper plates 33 to 36. Around the periphery of the plates are attached clothespins 37, the flat surface of which may bear indicia, for example as shown in connection with one of the pins on plate 34, or the information may be in the form of a label permanently or temporarily attached to the flat surface of the pin. As the pins have two flat surfaces, they may be used with two different notations simply by turning them around. Let us consider a simplified form of the problem illustrated in FIGS. 3 and 4, namely the development of a new pharmaceutical. The plate itself constitutes the underlying common property, in this case the problem of the research. Seven clothespins are shown, six representing different persons as in FIGS. 3 and 4, and the seventh perhaps an additional member who might be needed, for example a patent attorney to protect developments of the research project.

The clothespins are labelled with the same numbers corresponding to the six cutouts, the patent attorney being represented by clothespin 38. Plate 34 represents the different chemists available in the research department of the company in question, 33 the physicists, 35 the pharmacologists and 36 the clinicians. Now, the chemist, represented by the pin 19, is matched against the different chemists on the pins of plate 34. This might be effected by turning plate 32 slightly counterclockwise and then turning plate 34 until the pin corresponding to chemist #1 becomes opposite the pin 19. This would represent a decision, first, that the problem, plate 32, required the various men and, secondly, who was to be chosen from among those available in the organization as described above by turning the plate 34 to the particular chemist felt to be best fitted for the research, or even possibly one who had available time and was not tied up with another problem. In the same way the other pins on 32 could be matched up with physicists, pharmacologists, analysts and the like by suitably turning plate 32 and then plates 33, 35 and 36 in turn in order to match up a particular person with the requirements of the job or project. A very clear overall picture of the manpower available is thus presented, and it can be explained to or considered by management to pick the best team.

It is also readily feasible to remove the clinician 18 and the patent attorney 38 at the start because these men might not be needed at the inception of the research project. Also, it facilities discussion. Suppose that the the first thought was to use chemist #1, as the chemist represented by pin 19. This might result in a discussion as to whether this would be the best chemist for it or whether another one, perhaps chemist #3, might be more suitable. Suppose chemist #1 was chosen, the pin 19 would be removed from the plate 32 and the chemist #1 attached.

Now, when the team to start the research project has been determined, the patent attorney 38 might be attached to the plate 32 to make preliminary search to determine whether the project would involve infringement of other patents or what the prospects might be of obtaining patent protection if the project is successful. After he has performed his function, the pin 38 could be removed from the plate 32 for the time being.

The research would then start and presently there might be some products requiring testing, and the clinician 18 would then be attached until such time as he was no longer required, temporarily or permanently. Presumably the men represented by pins 19, 20, 21, 22 and 23 would have to stay with research more or less for its life. However, it is possible that after a good compound had been developed and the clinical testing appeared promising, the patent attorney would again be called in, pin 38 attached to plate 32, to advise whether a few more experiments might be desirable in order to obtain further examples to support more adequately the proper scope of patent protection. If it is decided that this is worthwhile doing, the connection of the patent attorney would remain for the time being. It is also possible that when the commercially chosen new compound was developed that a different chemist, or a chemical engineer, might be attached who has special skill in economical purification processes so that production costs could be lowered. In such a case this chemist, who might be chemist #4 would have his pin attached to plate 32.

The same general arrangement of material might be used for a purely business problem, namely the determination of a marketing and production program. In this case, initially the plate 32 would probably have a market analyst, one or more salesmen, a representative of the production department; and probably, at the beginning, a patent attorney might be called in to determine trademark questions. After the trademark questions were determined, the patent attorney would be removed and the test marketing would proceed. Presently the result might need the skilled consideration of a statistician and possibly also a computer programmer or operator. These pins would then be attached to the plate and then finally when it was determined that the product was well received, production scheduling men, purchasing agents for raw materials required and the like may be called in and represented by pins. It will be seen that the modification of the present invention which has just been described is extremely flexible. Also, because the materials used are so cheap, which is one reason why ordinary paper plates and clothespins are preferred and very practical form of material elements, the situations at each particular stage can be laid aside with the pins in question remaining attached to a plate and a new plate started with the pins needed for the next stage of the operation.

It will be seen that the modification described in conjunction with FIG. 5, when analyzed, is relating a number of quite different individuals or skills around a plate which represents a common interest or characteristic, a research project, a marketing project, or other common denominator. This thought can be abstracted so that the common characteristic is no longer a specific or concrete project. It may be a concept. For example, in a general scientific survey it may be important to show a class or individual how differently disciplines consider the concept heat. For example, to a mathematician this may represent equations showing flow in time, and an appropriate label on the mathematician's pin might set this forth. In fact, since there are two sides to the pin, one side might be labelled with a discipline and the other side with its mental approach.

Continuing the thought, to the chemist heat is primarily a determinant of reaction rate or, secondarily, of stability in distillations. To an engineer heat may represent a source of power. To a theoretical physicist it represents certain molecular oscillations. To a geologist or geographer it may represent climate or seasons, and so on. The present invention permits a graphical showing of how apparently quite different, and oftenly thought mutually exclusive, scientific disciplines can all have relations to an underlying concept and can make their particular contribution thereto. This permits a very effective teaching aid because otherwise it is too easy for students to come to think of different metal disciplines as watertight compartments.

The underlying relationships represented by the plate to which various different pins are attached may represent things which to a well educated man appear trivial. For example, if the underlying concept is two, for example as represented by the prefix bi, a mathematican may think of binary numbers, the electrical engineer of two-phase currents, the anatomist bilateral symmetry, the biologist, and particularly a geneticist, the effect of two sexes in determining inheritance and the like. Another may think of bi-metallic strips in measuring instruments, bi-racial committees in politics, and the like. In the illustration given, the underlying concept seems trivial because, while true, it does not relate to the same or very similar phenomena; however, such a trivial relationship may be a valuable teaching aid to children in the primary grades, for example showing the bi-lateral symmetry of most living animals and birds, the two sexes, night and day, etc. Although adult, it may be an extremely interesting and valuable concept to the much younger child in the grades.

Figure 6:
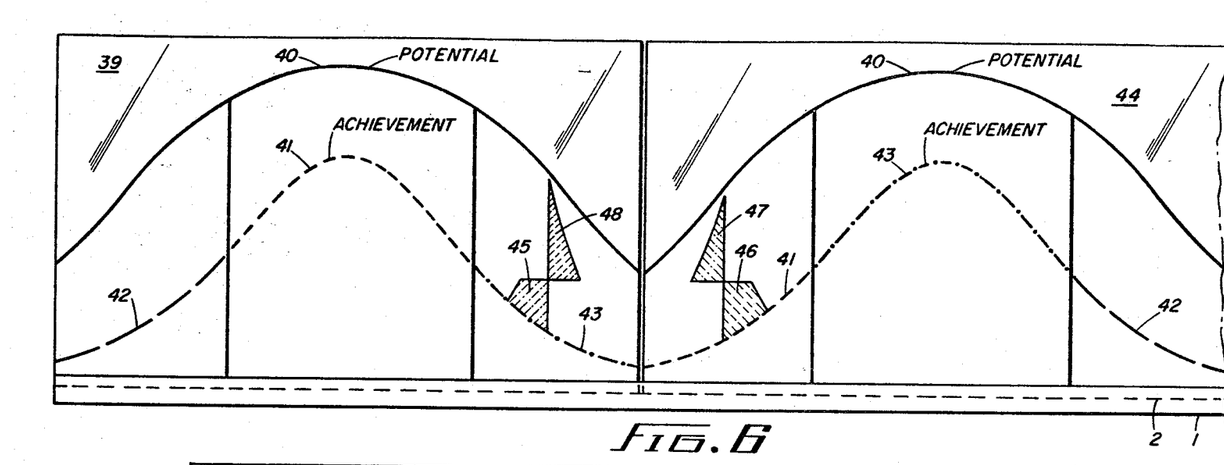
FIGS. 6 and 7 represent two transparent profiles in parallel grooves.
Figure 7:
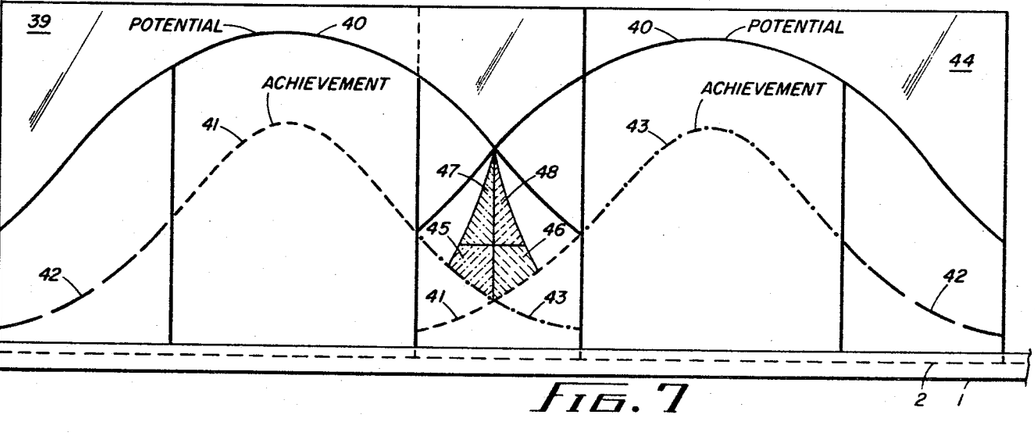

FIGS. 6 and 7 illustrate the process by which a graphical representation can show the effect of working together of men having different scientific knowledge or training. At the left in FIG. 6 is shown a profile drawn on transparent plastic 39. This represents the profile of a chemist. His potential for growth is represented by a solid line 40, his achievement at the start by the dashed line 41. It will be noted that this is a dashed line in the central portion of the curve which represents his achievement in his chosen field at the start of an association represented by the drawing. On either side of the central zone are two other disciplines, for simplicity 42 being shown in long dashes as the chemist's knowledge of mathematics at the time he started. On the right side there is a dot and dash line 43 which represents his knowledge of physics. It will be noted that these lines slope because certain portions of mathematics and physics are more closely related to the chemist's own primary field of knowledge and so he has achieved more knowledge in them than certain other parts where the relationship is not so direct.

On the right there is shown a transparent sheet representing the profile of a physicist. Again, the physicist's potential for learning is shown by the solid line 40, which is the same in nature as the correspondingly numbered line for the chemist. The curve for the physicist is shown as a reversed right and left, for reasons which will become apparent. In the center of the curve the physicist's achievement already made is shown in the dot and dashed line at 43, and his knowledge in chemistry at the left in the dashed line 41 and his knowledge of mathematics in the long dashed line 42 at the right. Both rectangular thin sheets of plastic are mounted in grooves 2 in a substrate or board 1, which is similar in its nature to that shown in FIGS. 1 and 2 because this is another instance of profiles which are going to be moved in parallel planes.

The chemist's profile shows a certain area of physics 45 which he could readily learn working by himself. Similarly, the physicist's profile shows an area 46 of the chemistry which he could learn by himself. The chemist also has an area 48 which represents the chemistry which he could teach a physicist working with him on a project; and similarly, the physicist's profile shows an area 47 of the physics which he could teach a chemist working with him.

If the two men now start working together, a situation represented by sliding the two profiles as shown in FIG. 7, it becomes apparent that after a while each man will have taught the other man a portion of his science relating to the problem at hand, and it is obvious that both men after this mutual teaching will have reached their potentials in this narrow area which represents the field of endeavor, whereas neither man alone could have reached the potential in both his primary field and that of the other. The moving together of the two profiles results in a dramatic and graphical exposition of the advantages of having men of different disciplines working together on a common problem, and the process by the graphical representation permits a much quicker and more impressive exposition of this facet of learning on a common problem by men of different major scientific fields.

Figure 8:
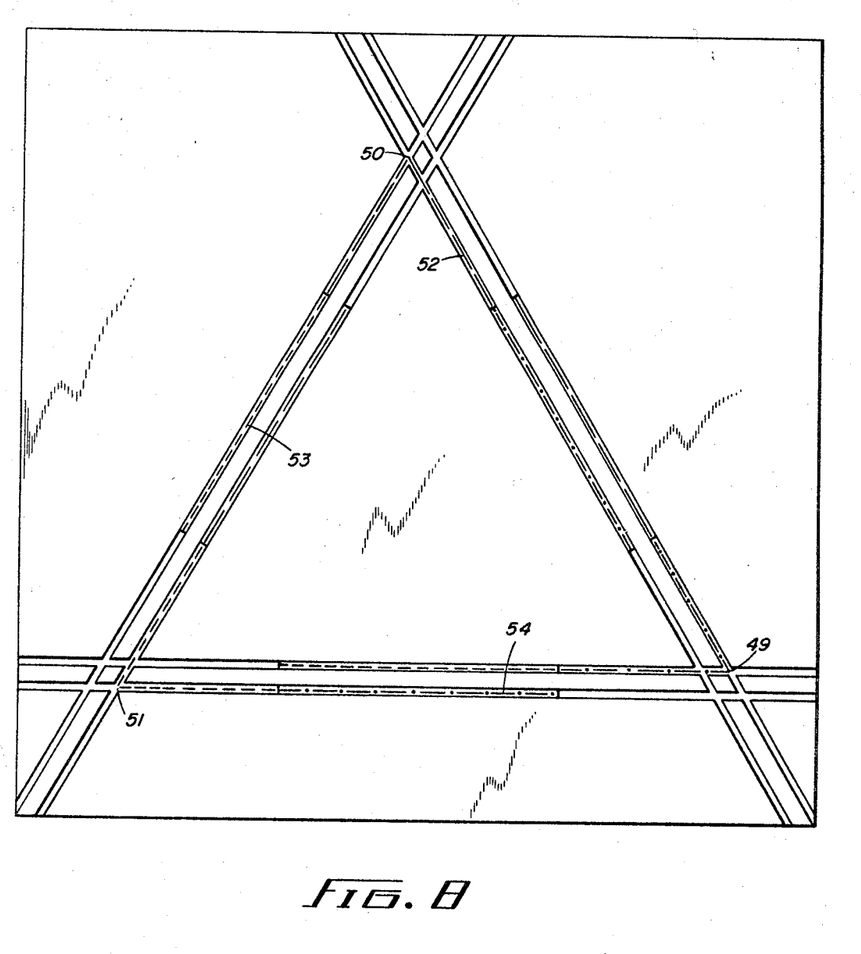
FIG. 8 is a plan view of a grooved board with triangularly oriented grooves.

The representation as shown in FIGS. 6 and 7, and as will later on be pointed out in FIG. 8, illustrates one of the most important fields of the present invention. The field of a project, as far as disciplines of the two or more men is concerned, is represented by the overlap in FIG. 7. The exposition by means of these profiles shows a type of growth and development when men from different scientific fields or from other intellectual fields work together. Examples of such other fields are law, business, sales, production, advertising, etc.

It should be noted that FIGS. 6 and 7 are static or stationary representations, as of course are all drawings, but that by showing the two profiles separated from each other in FIG. 6 and then showing them after they have been moved together in FIG. 7, the same results is achieved as if the profiles had been actually moved during the exposition, which would have been feasible with an audience of sufficiently small size. And so, of course, had the audience been of such size that the profiles could not have been moved, a slide could have been taken of FIG. 6 and then a second slide of FIG. 7 and first one slide thrown on a screen and then the other. Therefore, being able to alter the position of elements in the present invention need not necessarily mean actual physical movement during the exposition before the audience.

FIG. 8 illustrates a situation analogous to that shown in FIGS. 6 and 7 but three men whose major fields are different. An example might be three scientists, a chemist, a physicist, and a mathematician. The same code of representation by dashed lines with short dashes, lines with long dashes, and dot-dash lines will be used in connection with FIG. 8. Because we are now dealing with three different scientists and might wish to illustrate what each can teach the other, it is not practical to represent this in a two-dimensional set of profiles. Essentially what we have here is that the primary field of endeavor is shown going around a corner. Thus the chemist's profile would either have to be folded or on separate profiles at the corner marked 51. The physicist's would extend around the corner 50. The same showing of what a man can learn can be shown by the movement of a second part of the physicist's profile at 54, which can be moved toward the corner 51 to show the overlap which will cause the chemist to teach the physicist some chemistry and the physicist to teach the chemist some physics. In a similar manner, a movable part of the mathematician's profile 52 can be moved toward the corner 49 and show how he can teach the physicist some mathematics and the physicist teach him some physics. In a similar manner the other part of the chemist's profile 53 can be moved toward the corner 50 to show the same kind of growth with respect to chemistry and mathematics.

Figure 9A:
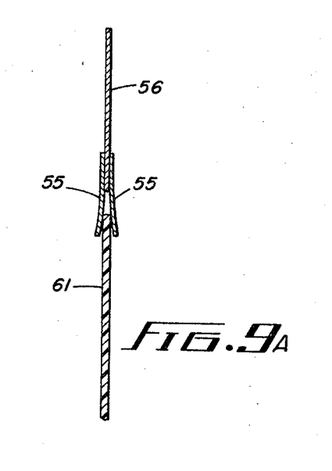
FIGS. 9A and 9B are sections through a label applied to a profile and mounted in a groove respectively.
Figure 9B:
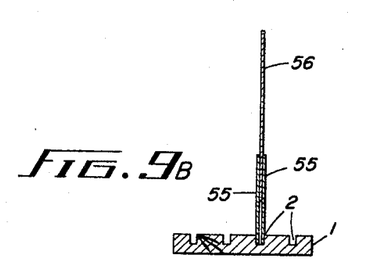

It is possible to show graphically the mutual learning of more than three kinds of scientists, but this would require a board with a large number of diagonal paths. Of course with four men there would have to be three pieces of each man's profile, because there must be movable pieces with respect to three other scientists instead of two, as in the case of FIG. 8. The principle, however, is the same, and the invention permits a graphical exposition of growth by working together on the same project. FIGS. 9A and 9B show a label 56 with two spring jaws 55, 9A showing it attached to the periphery of a profile 61 and 9B showing the same spring jaw making a tight hold in a groove 2 in a board. Because of this additional versatility this type of tab is preferable in many ways to a clothespin, though in some cases costing more. Obviously, of course, a profile as such may have spring jaws to help it fit into a groove, as shown for the label in FIG. 9B, and of course a whole profile may act as a label and be fastened onto another profile at a particular point where such representation is desirable. This is another example of the great versatility of the present invention.

Figure 10:
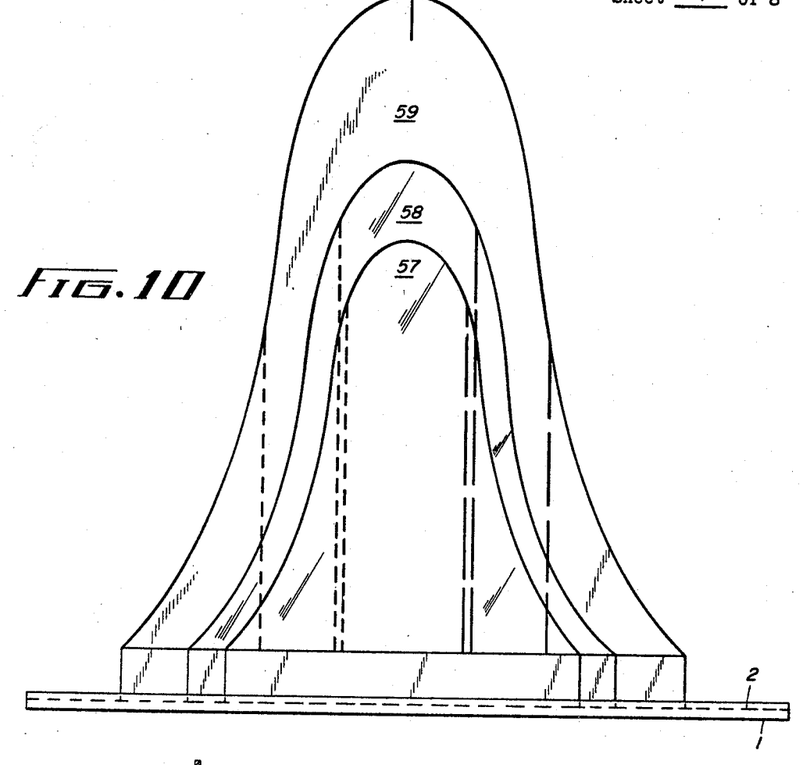
FIG. 10 is a series of profiles on transparent material representing growth or knowledge.

FIG. 10 illustrates a series of profiles 57, 58, and 59, which are transparent and which can be placed one in front of another. Obviously, of course, a single transparent profile may be used at a time. This illustrates the growth of a specialist, let us say a chemist. He starts off as a young man with a profile represented by 57.

Let us assume that he works in chemistry for the next few years. This will increase his special knowledge and broaden his knowledge of chemistry to some extent. This is represented by the profile 58.

Then let us assume that the chemist now spends a large number of years working in the field represented by the central portion of the profile, that is the field in which he was most skilled when he first started. For example, he might have been an organic chemist who had specialized in his educational days in dyestuff chemistry. The work that he did for the first few years broadened him somewhat but did not excessively increase his specific knowledge of dyestuff chemistry. As has been pointed out above by the fact that the profile 58 has not risen very greatly vertically. Now if he works for years, for example as a group leader, in dyestuff chemistry, he finally reaches the profile represented by 59. This has greatly increased his knowledge of dyestuff chemistry, but because of the responsibility of his position he has to give consideration to other facets of chemistry and so, although there has been quite a spectacular increase in his narrower field of specialty, he has also broadened out his chemical knowledge. This is shown by the fact that in this profile there has been some further broadening or growth laterally. FIG. 10 illustrates only one of numerous possibilities of graphical exposition or explanation of the effect of experience on the growth of a scientist.

Figure 11:
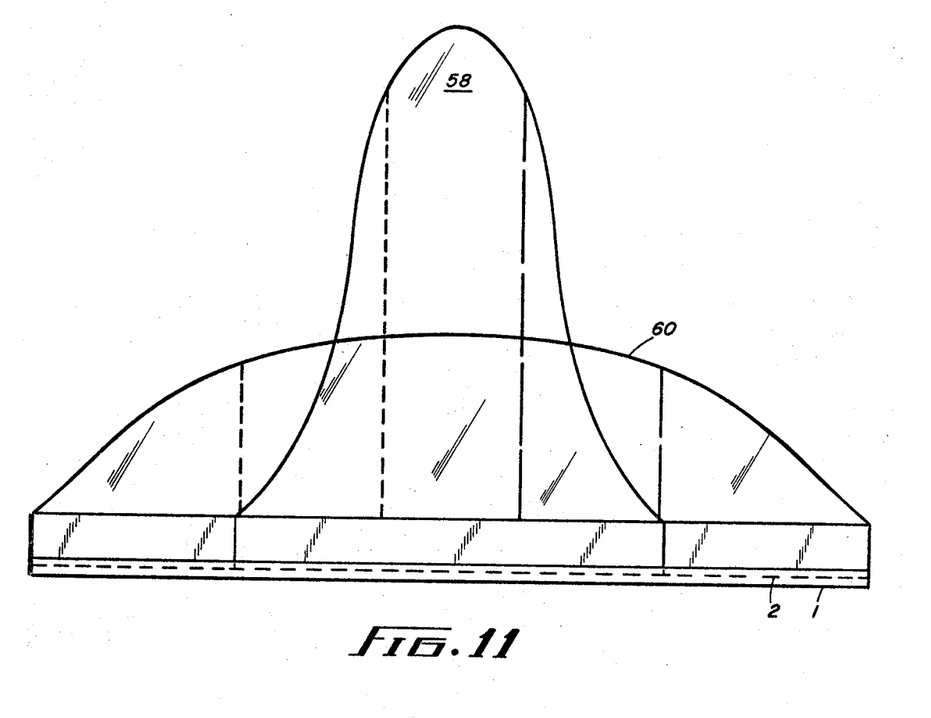
FIG. 11 is a similar representation of two profiles which show development from one type of knowledge and experience to another.

FIG. 11 represents a somewhat different situation. Again let us consider that it was a chemist, and he is represented after some years of experience by the profile 58. Now he is transferred or promoted to more general business executive work and in a number of years he has to learn a great deal in quite different fields and has not had as much further experience in his own specialty. Finally he becomes a well-rounded general executive, represented by the profile 60. The two profiles show the same area, which indicates that the man has still the same general total intellectual capacity, but in learning what he needed to in the very greatly different scope of his later work he has had to forget or partially forget some of the knowledge in his own original special field of competence. FIG. 11 would illustrate in an extreme form that unfortunately, one can often not learn a great deal about quite different fields without having to forget some of the special knowledge in a field in which he is now no longer working. The exposition would give a graphic illustration of this general truth. It of course might be followed by a somewhat modified one, for example a situation where the same man had also increased his total intellectual potential, and in such a case this would be shown by a larger profile 60 representing more total area. In general, the profiles which have been shown in many of the drawings show symmetrical curves. For many basic educational expositions, such idealized profiles are very useful to bring out the points being explained. Of course in a great many cases an individual will not have a nice, symmetrical, idealized curve, and so such an actual profile may be quite unsymmetrical and it is an instance of the flexibility of the present invention that such profiles can also be shown. Ordinarily education or explanation of problems tends toward the more general and basic and often this is best done by rather idealized, symmetrical profiles. Some actual profiles might be so bizarre in shape that the audience might be too much interested in the peculiar contours and so perhaps miss whta is really being taught or explained. In some cases, however, such unsymmetrical profiles are the things to be used, and of course any profile may be used in the present invention, which is one of its practical advantages.

As has been mentioned above, it has been proposed to make expositions with boards having grooves. The present invention is not concerned with any static display. It is directed to a dynamic thing, such as education, explanation and the like, and the movement of various elements, either literal movement in a board or, as has been pointed out above, by showing slides or other static representations of profiles or other elements in different positions, constitute the important new effects which the present invention makes possible. We are not dealing with static boards but only with processes or mechanical setups which permit change of position and/or motion.

Great flexibility of the present invention has been shown, which can be used for explaining and teaching things which are both complex or simple depending on the result desired. Similarly, in teaching, the modifications shown in FIGS. 1 and 2 may be of importance quite apart from the determination of quantitative profiles for which they have been described in detail above. Thus, for example, if it is desired to illustrate to a class in physics or chemistry the use of infrared spectra for analytical purposes, a profile of the spectrum may be placed in front of a more complex spectrum of a compound or a mixture and it can be shown that the infrared spectrum can determine the presence or absence of certain constituents or even chemical radicals. The change as shown by moving cutoff profiles in grooves or along other determined paths can be used to show markedly different absorptions in the atmosphere, for example by moving infrared absorption spectra of water vapor into and out of a portion of the radiation spectrum of the sun or some other radiator, showing that if the water vapor is present certain radiation bands will not pass. This can be used both for teaching of the physics of the air and also, in a more simplified manner, to younger children to show why we do not have frost on cloudy nights. In every case the present invention permits a very clear and very flexible illustration of relationships, either qualitative, as for example in the modification of FIG. 5, or quantitative or semi-quantitative, as in the profiles of FIGS. 1 to 4. The present invention therefore represents a valuable graphical illustration for teaching, illustrating or explaining scientific, business and similar relationships.

When the number of profile cutouts or segments, or even the number of labels, in a modification such as that described in FIGURE 5 is not too large, they are best picked out by the person who is going to use the present invention to make the demonstration or to set up graphically a proglem. However, the invention is also useful where the choice may involve a very large number of people. In such cases the appropriate profiles, segments or labels can be chosen with the aid of any suitable mechanical or other device, such as a computer.

I claim:

1. A process for graphical exposition of a plurality of interrelated measurable mental characteristics or disciplines in successive stages of development comprising the following steps:
    (a) producing a plurality of graphical profiles, one for each of said characteristics or disciplines, each profile having a shape the dirensions of which correspond to values in at least two coordinates;
    (b) displaying said profiles in first positions wherein their dimensions can be combined to indicate the cumulative values of the profiles at an initial stage of development;
    (c) producing second positions of at least some of said profiles indicative of change in the measured amount in each characteristic or discipline acquired over a period of time, and
    (d) the profiles after step (c), having their dimensions again combined to indicate the cumulative values of the profiles at a later stage of development.

2. A process according to claim 1 in which the vertical profiles are physically movable along predetermined paths on a substrate to produce profile overlap.

3. A process according to claim 2 in which the vertical profiles are on thin, essentially transparent material and are represented as at least one curved area on each member.

4. A process according to claim 1 in which at least some of the profiles represent two dimensional coordinates of kinds and depth or extent of particular personal characteristics or concepts.

5. A process according to claim 2 in which at least some of the profiles represent two-dimensional coordinates of kinds and depth or extent of particular personal characteristics or concepts.

6. A process according to claim 5 in which at least one of the curved areas represent requirements of a problem and at least one other curved element on a different vertical profile represents personal characteristics of a particular type of human being.

7. A process according to claim 2 in which the paths on the substrate intersect, whereby three-dimensional graphical exposition results.

8. A process according to claim 2 in which movable labels are slipped onto and off edges of a profile.

9. A process according to claim 2 in which the profiles represent depth of knowledge or achievement of each of a plurality of persons in a plurality of mental disciplines and the profiles contain areas representing what the person represented by a profile can learn by himself and areas which he can teach to a second person, the profiles being moved on parallel paths to produce an overlap to demonstrate the improvements in intellectual knowledge obtainable by having the persons represented by the profiles work together.

10. A process according to claim 9 in which the profiles represent more than two persons, they are moved on more than two parallel paths, and there are a number of profiles for each person equal to the total number of persons involved, whereby the effects of working together can be shown and increasing the knowledge of each person in the fields where he can learn and be taught by another person.

References Cited

UNITED STATES PATENTS 2,068,226   1/1937   Buck _______________ 35—24
2,917,836   12/1959   Balinkin et al. ______ 35—28.3

LAWRENCE CHARLES, *Primary Examiner.*